US006711655B1

(12) United States Patent
Wyland

(10) Patent No.: US 6,711,655 B1
(45) Date of Patent: Mar. 23, 2004

(54) FINDING AVAILABLE MEMORY SPACE BY FINDING ITS ASSOCIATED MEMORY TRANSFER CONTROLLER

(75) Inventor: David C. Wyland, Morgan Hill, CA (US)

(73) Assignee: Cradle Technologies, Inc., Mountain View, CA (US)

( * ) Notice: Subject to any disclaimer, the term of this patent is extended or adjusted under 35 U.S.C. 154(b) by 248 days.

(21) Appl. No.: 10/061,668

(22) Filed: Feb. 1, 2002

Related U.S. Application Data

(60) Provisional application No. 60/266,002, filed on Feb. 2, 2001.

(51) Int. Cl.[7] .............................................. G06F 12/00
(52) U.S. Cl. ........................................ 711/154; 711/147
(58) Field of Search ................................ 711/147, 149, 711/154

(56) References Cited

U.S. PATENT DOCUMENTS

| | | | | |
|---|---|---|---|---|
| 4,554,630 A | * | 11/1985 | Sargent et al. ................. 714/27 |
| 4,740,895 A | * | 4/1988 | Sargent et al. ................. 714/25 |
| 5,249,280 A | | 9/1993 | Nash et al. ................. 395/425 |
| 5,813,040 A | | 9/1998 | Rathke ......................... 711/156 |
| 5,937,186 A | | 8/1999 | Horiguchi et al. ........... 395/591 |
| 6,052,756 A | * | 4/2000 | Barnaby et al. ............. 711/105 |
| 6,457,104 B1 | * | 9/2002 | Tremaine et al. ............ 711/133 |

* cited by examiner

Primary Examiner—Kevin Verbrugge
(74) Attorney, Agent, or Firm—Thomas Schneck; Nissa M. Strottman

(57) ABSTRACT

A system and method for finding available memory space associated with an inactive memory transfer controller and activating the inactive memory transfer controller using indexed addressing. A memory transfer engine includes a plurality of memory transfer controllers, each configured to move data from a source address to a destination address. An active memory transfer controller can execute an instruction to find an inactive memory transfer controller associated with available memory space. The inactive memory transfer controller is activated by writing to its hardware registers, thereby assigning it a task, using indexed addressing.

17 Claims, 7 Drawing Sheets

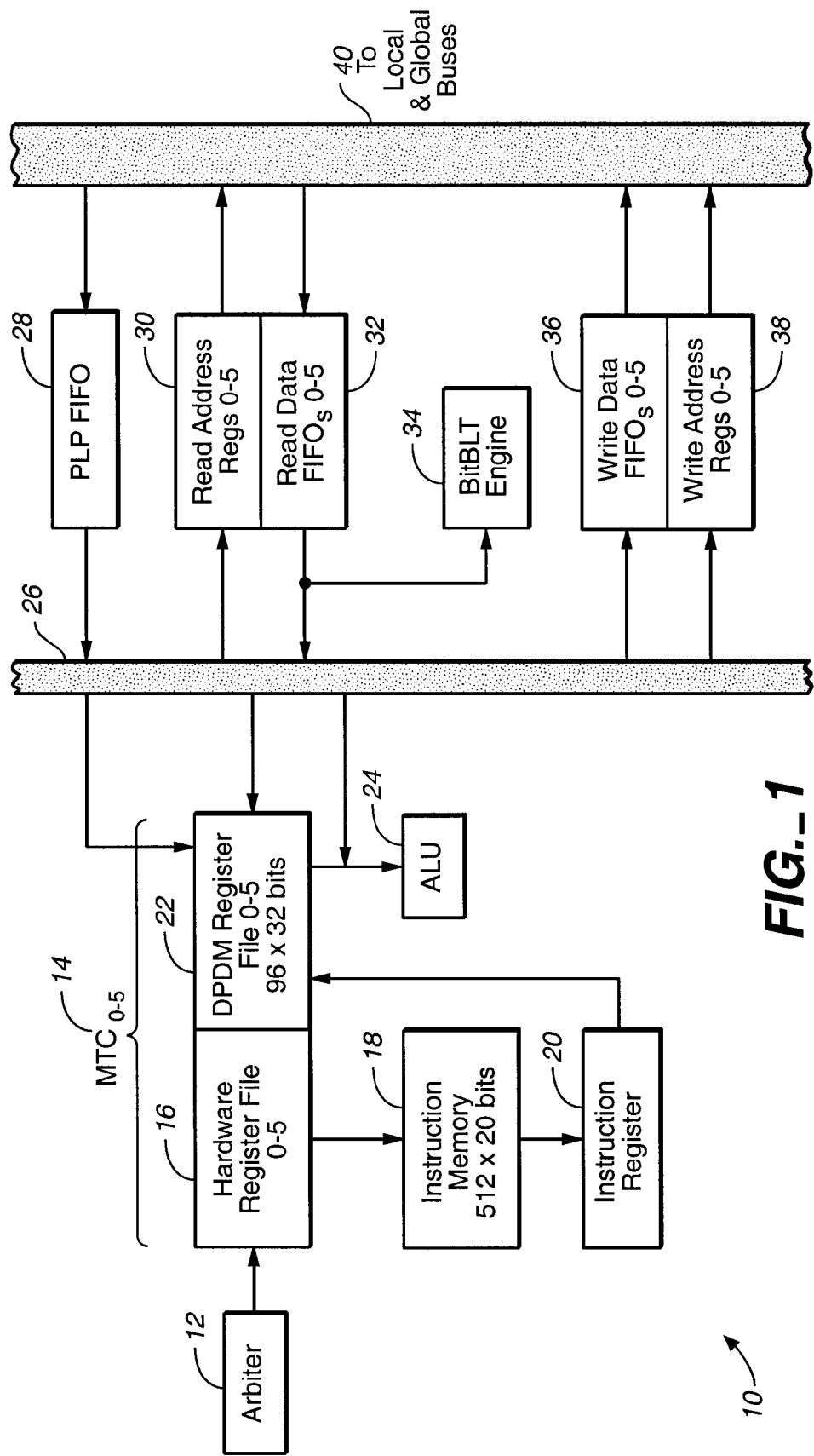
FIG._1

MTC Program Addressable Registers

| Reg | Addr | Name | Type | R/W | Function | Comments |
|---|---|---|---|---|---|---|
| 0-15 | 0-120 | R0-R15 | | RW | Data Registers 0-15 | |
| 16 | 128 | PLP | Com | RO | Parameter List Pointer FIFO | Read Only: Read pops FIFO |
| 17 | 136 | PLT | Com | RO | PLP FIFO tag bits | Read Only: Address LSBs |
| 18 | 144 | PEEKL | | RO | Read FIFO Peek, low 32 Bits | |
| 19 | 152 | PEEKH | | RO | Read FIFO Peek, high 32 Bits | |
| 20 | 160 | BBC | | RW | BitBLT Byte Counter | 24 bits |
| 21 | 168 | PXL | | RW | BitBLT Pixel Fill register | 32-bit pixel fill |
| 22 | 176 | | | RO | Reserved | |
| 23 | 184 | SINC | | RO | Source Increment | BitBLT Address increments |
| 24 | 192 | DINC | | RO | Destination Increment | BitBLT Address increments |
| 25 | 200 | RSD | Com | RW | RS Result | |
| 26 | 208 | MX | | RW | MTC select for indexed access | MTC H/W regs map to 112-127 |
| 27 | 216 | CA | | R-W | Quad Base Addr & MTC Offset | Write = XW Set Run |
| 28 | 224 | MEM | | RW | Read FIFO, Write FIFO | Each MTC has one of each |
| 29 | 232 | LC | | RW | Loop Counters | 12 Bits |
| 30 | 240 | RA | | RO | JSR Return Addresses | Read Only |
| 31 | 248 | PSW | | RW | MTC PSW | Read while running |

FIG._2

Register Addressing In MTC Functions

| Address | Register Selected @ MX = N (0-5) | Register Selected @ MX = 6 or 7 |
|---|---|---|
| 0-15 | My Data Registers | My Data Registers |
| 16-31 | My Hardware Registers | My Hardware Registers |
| 32-47 | MTC 0 Data Registers | MTC 0 Data Registers |
| 48-63 | MTC 1 Data Registers | MTC 1 Data Registers |
| 64-79 | MTC 2 Data Registers | MTC 2 Data Registers |
| 80-95 | MTC 3 Data Registers | MTC 3 Data Registers |
| 96-111 | MTC N Data Registers | MTC 4 Data Registers |
| 112-127 | MTC N Hardware Registers | MTC 5 Data Registers |

FIG._3

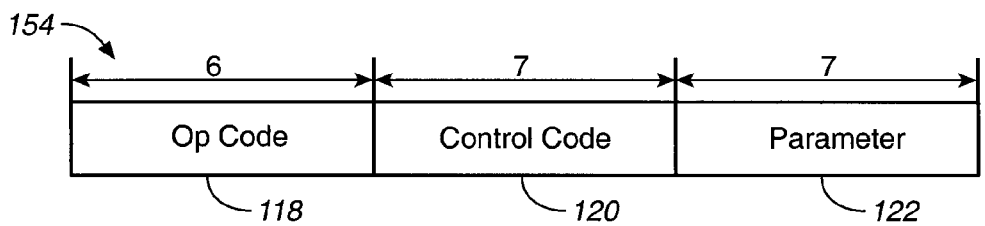

FIG._4a

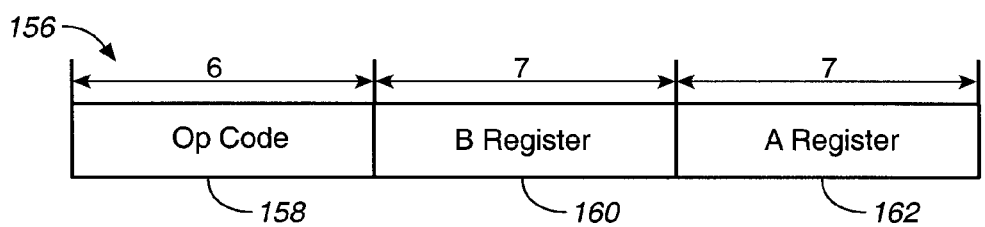

FIG._4b

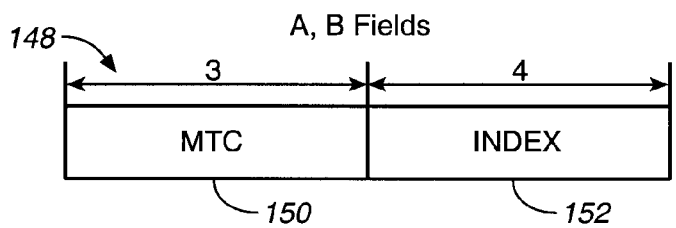

FIG._4c

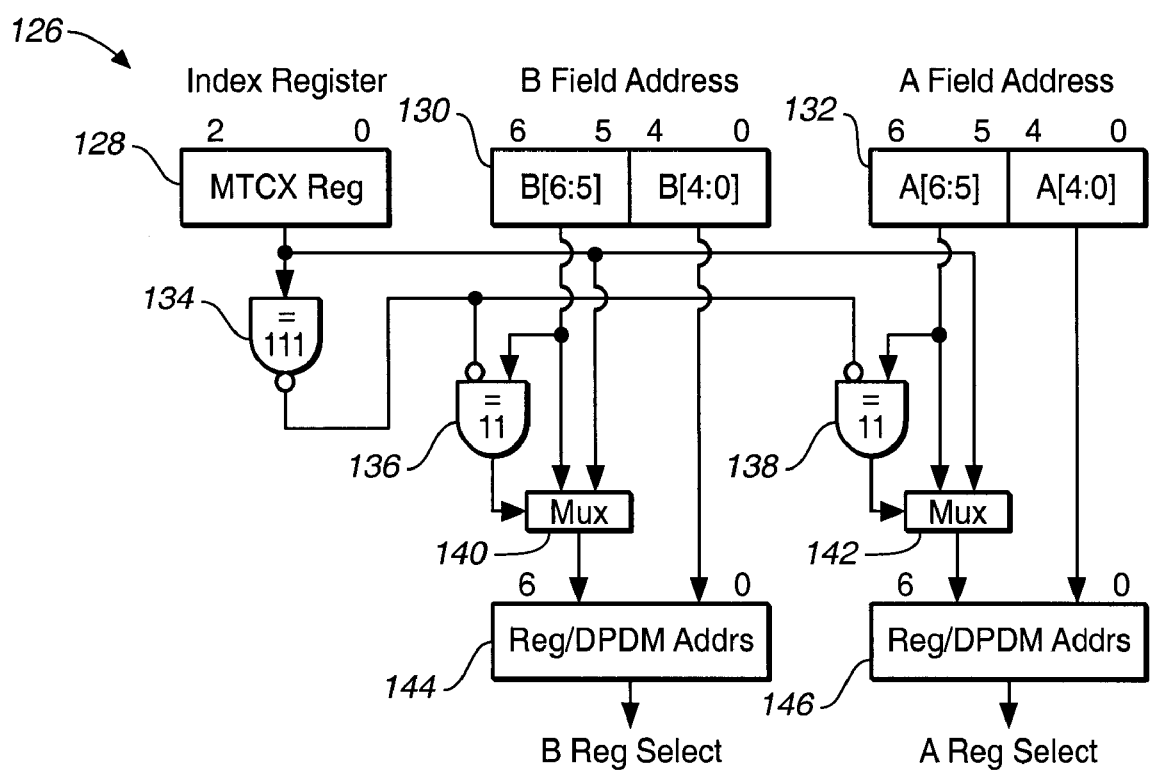
FIG._5

MTC PSW Bit Assignments

| Bit | Name | Run=0 | Run=1 | Instr | Function |
|---|---|---|---|---|---|
| 31 | WAKE | R/W | RO | R/W | Wake up (set Run) if PLP FIFO not MT |
| 30 | XW | R/W | RO | R/W | External Wake up: Set Run if external write to R27 |
| 29 | WFD | RO | RO | RO | Waiting for data flag |
| 28 | ENABLE | R/W | RO | R/W | Enabled for arbitration: Set by Pause N or Enable N |
| 27 | CF | R/W | RO | R/W | Constant Fill mode for BitBLT |
| 26 | C24 | R/W | RO | R/W | 24-bit Constant Fill mode (BitBLT) |
| 25 | CAP1 | R/W | RO | R/W | Local Cache Allocation Priority => PE0-3 |
| 24 | CAP0 | R/W | RO | R/W | Local Cache Allocation Priority => PE0-3 |
| 23 | GBP1 | R/W | RO | R/W | GB Priority 1 |
| 22 | GBP0 | R/W | RO | R/W | GB Priority 0 |
| 21 | HP | R/W | RO | R/W | MTC High Priority (to MTC arbiter) |
| 20 | DONE | RO | RO | RO | BitBLT Done: Byte Count = 0 |
| 19 | OV | RO | RO | RO | Overflow flag |
| 18 | CY | RO | RO | RO | Carry Flag |
| 17 | S | RO | RO | RO | Sign Flag |
| 16 | Z | RO | RO | RO | Zero Flag |
| 15 | TE | R/W | RO | R/W | GB Transfer error: read or write to an undefined addrs |
| 14 | RLE | R/W | RO | R/W | Read Lock Error: Req FIFO Full or Rd FIFO MT & no req |
| 13 | STEP | R/W | R/W | RO | MTC Instruction Step |
| 12 | RUN | R/W | R/W | RO | MTC Run |
| 11 | STOP/RST | R/W | R/W | RO | Read = QSTOP, Write = Reset MTC |
| 10:9 | | | | | reserved |
| 8:0 | PC | R/W | RO | RO | MTC Program Counter |

FIG._6

MTE Control Instruction Code Assignments

| Control Field | Name | Parameter Field | Control Function |
|---|---|---|---|
| 0 | NOP | | No Operation |
| 1 | HALT | | Clear MTC Run, flush Write FIFOs and wait for another Start |
| 2 | BHALT | | Breakpoint halt: same as HALT but different op code |
| 3 | STOP | | Set Stop bit in Quad Status Word |
| 4 | RETN | | RETA=>PC (subroutine return) |
| 5 | FLUSH | | Clear Read Request & Read Data FIFOs |
| 6-15 | | | reserved: nop |
| 16 | ENABLE | Enables | Set/Clear MTC ENABLE bits in the PSWs |
| 17 | PAUSE | Enables | Set the Enable bits & pass control to next active MTC |
| 18 | SLEEPW | | Clear Run and set the Wake-up bit |
| 19 | SLEEPX | | Clear Run and set the XW bit |
| 20 | NEXT | | Set MTCX register to next available MTC. Set Zero flag if none |
| 21 | BMV1 | | BitBLT direct move 1 octet from RFIFO to WFIFO |
| 22 | BMV2 | | BitBLT direct move 2 octets from RFIFO to WFIFO |
| 23 | BMV4 | | BitBLT direct move 4 octets from RFIFO to WFIFO |
| 24-127 | | | Reserved |

FIG._7

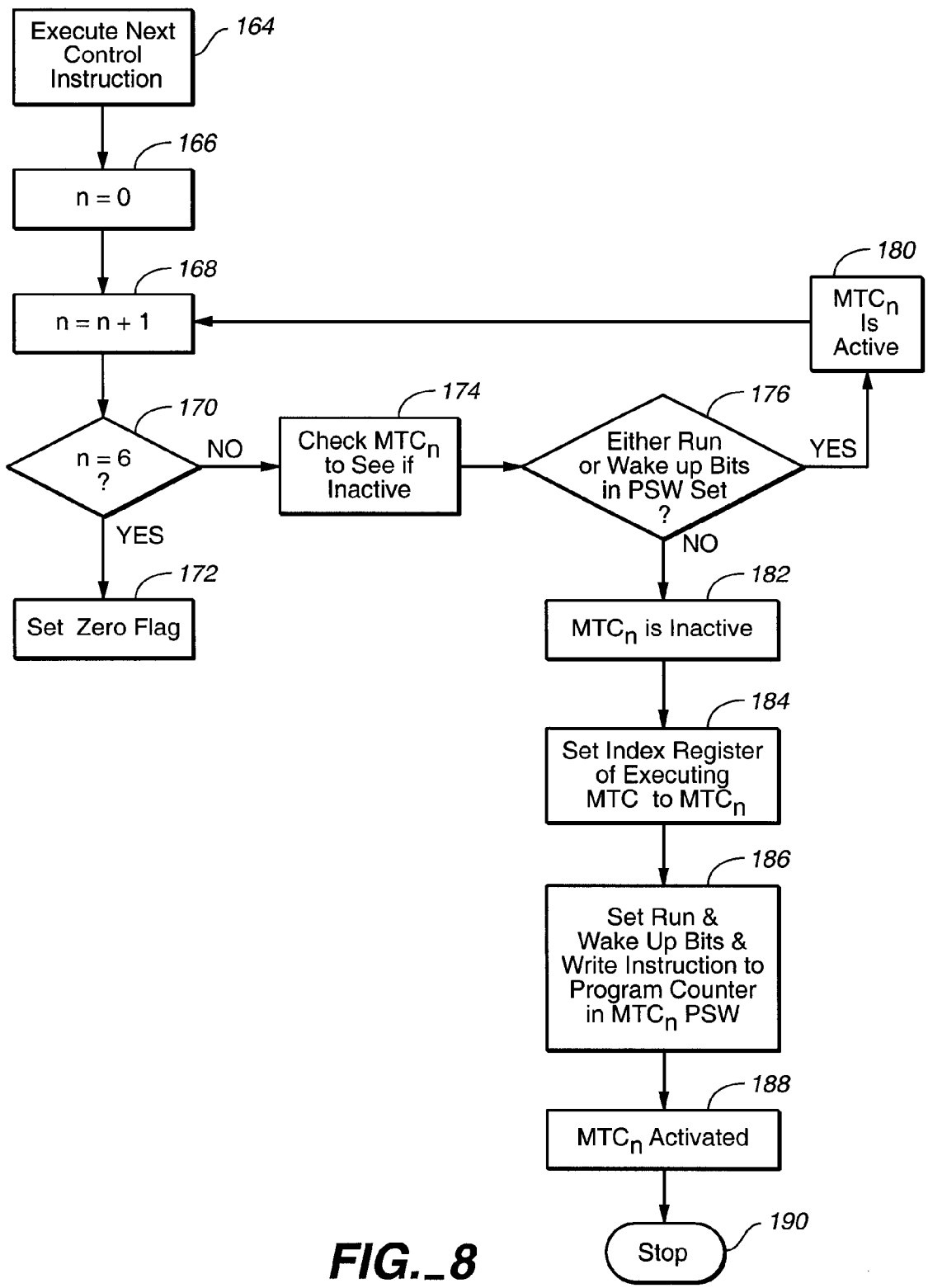
FIG._8

FINDING AVAILABLE MEMORY SPACE BY FINDING ITS ASSOCIATED MEMORY TRANSFER CONTROLLER

CROSS-REFERENCE TO RELATED APPLICATION

This application claims the benefit of U.S. provisional application No. 60/266,002, filed Feb. 2, 2001.

FIELD OF THE INVENTION

This invention relates to memory transfer engines in semiconductor chips.

BACKGROUND OF THE INVENTION

As the demand for high performance microprocessors increases, efficient transfer of data to memory becomes increasingly important. One mechanism for efficient transfer to memory is indexed addressing, which enables different memory banks to be accessed. While one address may be specified in an instruction, different variables or controllers considered during address calculation determine the effective address where memory will be written.

In order for efficient memory transfer to occur, it is also necessary to be able to quickly identify available memory. As shown below, the prior art offers various approaches to this problem.

U.S. Pat. No. 5,249,280 shows a method of index addressing six memory banks. In a first method, a number from 0 to 5, which corresponds to one of the memory banks, is stored in an index register using a 4-bit subfield. During an effective address calculation using index-addressing mode, a 16-bit logical offset stored in an offset register is appended to the index register to form a 20-bit address specifying a specific memory bank. If sequential memory accesses cross memory banks, the number stored in the index register will be automatically incremented to the next memory bank in sequential order.

U.S. Pat. No. 5,813,040 shows a CAM memory in which a controller includes a hardware-encoded bit map that tags locations containing valid data with status bits, read/write control logic, and search logic for selecting available memory locations. When responding to write instructions, the controller will use a linear search of the memory space to look for and stop at the first available memory location. Data is then written into the found memory location and a status bit is set which indicates that the memory location is no longer available for writing. This status bit is reset when either the memory location is read or the system is reset.

U.S. Pat. No. 5,937,186 shows a mechanism for identifying the next available memory space to store current register data when responding to an interrupt routine. This space is identified by reading the stored information of the previously-serviced routine. Each time a routine is serviced, header information is added to the current subroutine data. The header information includes a pointer to the previous subroutine data and the next available memory space.

It is an object of this invention to locate available memory space by determining which controllers associated with available memory are inactive.

Another object of this invention is to activate inactive memory controllers by assigning tasks to them by using indexed addressing.

SUMMARY OF THE INVENTION

A semiconductor chip's memory transfer engine (MTE) consists of a plurality of memory transfer controllers (MTCs), each MTC having direct access to its associated plurality of dual port data memory (DPDM) registers and hardware registers. Each MTC can also access the DPDM registers and hardware registers associated with the other MTCs in the MTE.

The MTE has one hardware processor which is shared among the MTCs in a round-robin, time-sliced manner. When an executing MTC relinquishes control of the processor, an arbiter chooses the next MTC to control the processor from the MTCs that are ready to execute an instruction.

The index register (MX register), one of the MTC's hardware registers, contains a value which, when considered with the address fields specified in MTC instructions, indicates which MTC's data registers will be involved in the execution of an instruction. The MX register allows the MTC to access register banks of other MTCs.

An executing MTC can execute an instruction to determine the identity of an inactive MTC, which is associated with available memory space. The currently executing MTC's MX register is loaded with an index to the inactive MTC. Using indexed addressing, the executing MTC activates the inactive MTC by writing to the inactive MTC's hardware register. The activated MTC is now ready to execute its assigned task.

BRIEF DESCRIPTION OF THE DRAWINGS

FIG. 1 is a block diagram showing the memory transfer engine.

FIG. 2 is an example of a register map of a memory transfer controller in the memory transfer engine shown in FIG. 1.

FIG. 3 is a chart showing register addressing for a memory transfer controller in the memory transfer engine shown in FIG. 1.

FIG. 4a is a block diagram of a control instruction issued by a memory transfer controller in the memory transfer engine shown in FIG. 1.

FIG. 4b is a block diagram of a register-to-register instruction issued by a memory transfer controller in the memory transfer engine shown in FIG. 1.

FIG. 4c is a block diagram of an address field in a register-to-register instruction shown in FIG. 4b.

FIG. 5 is a block diagram of logic employed to select a register by the memory transfer controller in the memory transfer engine shown in FIG. 1.

FIG. 6 is a chart showing processor status word bit assignments for a memory transfer controller in the memory transfer engine shown in FIG. 1.

FIG. 7 is a chart of control instruction code assignments for the memory transfer engine shown in FIG. 1.

FIG. 8 is a flowchart showing exemplary steps for locating and activating an inactive memory transfer controller in the memory transfer engine shown in FIG. 1.

DETAILED DESCRIPTION

With respect to FIG. 1, in this embodiment the index addressing system is employed in a memory transfer engine (MTE) 10, which consists of six memory transfer controllers (MTCs) 14 which move blocks of data from a source address to a destination address. (In this embodiment, the chip containing the MTE is a UMS0103, a multiprocessor manufactured by Cradle Technologies, Inc. However, the index addressing system could be used in any system where there are multiple memory transfer controllers.) Each of the MTCs 14 has direct access to its own group of 16 dual port memory data (DPDM) registers 22 (in this embodiment, 96×32 bits) and 16 hardware registers 16. Each MTC 14 can write to the DPDM registers 22 and hardware registers 16 associated with the other five MTCs 14. The MTCs 14 share the MTE's 10 hardware processor in a round-robin, time-sliced manner. No more than one MTC 14 executes an instruction at any one time; however, more than one MTC 14 may be active at any given time (i.e., waiting for data) (see FIG. 6, below). Each MTC 14 performs one task, such as transferring data, then relinquishes control of the processor to another MTC 14. An arbiter 12 chooses the next MTC 14 to execute an instruction. As will be shown below in FIG. 8, by using the index addressing system, each currently executing MTC 14 can activate an inactive MTC 14, thus providing a mechanism for identifying an available memory location.

Each of the MTCs 14 has its own Read FIFO 32 and Write FIFO 36 which operate independently from the other MTCs 14 Read and Write FIFOs 32, 36. Each MTC 13 also has its own Read Address Register 30 and Write Address Register 38, which are associated with the Read and Write FIFOs 32, 36.

The MTE 10 reads data in a split transaction. When an MTC 14 executes a READ instruction, the instruction writes the memory address into its associated Read Address Register 30. The read data is subsequently put into the MTC's 14 Read FIFO. When an MTC 14 executes a WRITE instruction, the data and address are each written into the Write FIFO 32 and the Write Address Register 38, respectively. The Write FIFO 32 logic writes the data into memory at the next available memory cycle.

The MTE 10 also has a bit block transfer (BitBLT) engine 34 which does byte alignment of data transfers on the fly. It takes an input stream from the Read FIFO 32 and generates the output stream into the Write FIFO 36. The MTC 14 sets up the FIFOs 32, 36 for the transfer and the BitBLT engine 34 moves the data.

The parameter list pointer (PLP) FIFO 28 is the command input FIFO for the MTE 10. Commands are issued to the MTE 10 by writing the address of a parameter block into the PLP FIFO 28. The PLP FIFO 28 occupies a global address range of 512 bytes and is 32 words deep. Writing to any address within its address range writes data to the PLP register (described below in FIG. 2). Interpretation of the PLP FIFO's 28 contents is done by MTE 10 firmware.

Instructions to be executed are fetched from the MTE's 10 instruction memory 18 (in this embodiment, 512×20 bits) and placed in the instruction register 20. The MTE's 10 Arithmetic Logic Unit 24 performs Boolean operations as well as addition, subtraction, and multiplication of integers.

With respect to FIG. 2, the MTC's program-addressable registers include data registers and hardware registers. A possible configuration of these registers is shown in the table 42, including the register number 44, the address 46, the name of the register 48, the type of the register, the read/write capacity of the register 52, the register's function 54, and comments about the register 56. Some registers of particular interest for purposes of this invention are the PLP register 58, the parameter list tag (PLT) register 60, the index register (MX register) 62, the MEM register 64, which shows the Read and Write FIFOs' status, and the Processor Status Word (PSW) register 66, which shows the MTC processor operation.

The PLP FIFO was described above in FIG. 1. Referring again to FIG. 2, when data is written to PLP register 58, a 9-bit address code or tag is also written to an extension of the PLP FIFO. The 9-bit address code indicates which address in the PLP FIFO's global address range was used. The MTE firmware can use this address code, or tag, by reading the PLT register 60. The MTE firmware can use this tag to select other MTE functions and other interpretations of the PLP FIFO contents.

The MX register 62 provides an index to the MTC being accessed. The MX register contains a value in the range of 0 to 7. A value of 0 to 5 points to one of the MTCs; a value of 6 or 7 has no effect. With reference to FIG. 3, the table 68 shows the registers selected depending on the addresses 70 specified in the instruction and the MX register value 72, 74. Addresses 0 to 31 always access the executing MTC's own data and hardware registers. Addresses 32–95 always access the data registers of MTC0-3 regardless of the contents of the MX register. When the MX register is 6 or 7, addresses 96–127 access the data registers of MTC4-5. If the MX register value is 0–5, addresses 96–127 access the data or hardware registers of the MTC specified by MX register value. Setting the MX register value will be discussed in greater detail below in FIG. 8.

With reference to FIGS. 4a and 4b, the MTE uses 20-bit instructions. The MTE instruction set consists of two types of instructions: register-to-register instructions 156 (FIG. 4b) and control instructions 154 (FIG. 4a). General purpose register-to-register instructions 156 are two-address instructions. They are of the form A op B to B. Register-to-register instructions 156 generate their results in the current cycle and write the results back in the same cycle. Each general purpose register-to-register instruction 156 is 20 bits long and consists of a 6-bit op code 158 and 14 bits of modifiers 160, 162. The modifiers correspond to A and B register field address fields 162, 160. (Control instructions will be discussed below in FIGS. 4a and 7.) As shown in FIG. 4c, the 7-bit address fields for A and B fields include 3 bits identifying the MTC register 150 and another 4 bits identifying the data register index.

Referring to FIG. 5, the value of the MX register and the A and B fields determines the actual register selected. In one potential embodiment 126 of the logic circuitry for selecting registers, the value of the index register 128, B field address 130, and A field address 132 are fed through logic circuitry including a NAND gate 134, AND gates 136, 138, and multiplexers 140, 142 to select the registers 144, 146.

Referring again to FIG. 2, the MEM register 64 corresponds to the MTCs Read and Write FIFOs. The MTC accesses the Read Data FIFO as the MEM register of the MTE data register set. Reading from MEM clocks data out of the FIFO. When the MTC writes to memory, it specifies MEM as the destination register in the transfer instruction.

The PSW register 66 shows MTC processor operation. With reference to FIG. 6, the table 76 shows MTC PSW bit assignments, including the bit 78, the name of the bit 80, whether the bits may be modified by an external write to the PSW's GBus address while the MTC is not running 82 or when it is running 84. The table 76 also indicates which bits may be modified by an instruction running on the MTC 86. The function 88 of each bit is also given. For this invention, bits of particular interest are: the wake-up bit 90; the external wake-up bit 92; the waiting for data flag 94; the enable bit 96; the high priority bit 98; the MTC instruction step bit 100; the MTC run bit 102; and the MTC program counter 104.

The run 102 and step 100 bits control the MTC clock. When the run bit 102 is one, the MTC clock runs and the MTC executes instructions. When the run bit 102 is zero, the MTC clock is stopped and the MTC is stalled. Setting the step bit 100 to one effectively sets the run bit 102 to one for a single MTC instruction; however, the actual state of the run bit 102 is left unchanged by the step, thus allowing a programmer to single step the MTC.

The wake-up bit 90 enables the MTC to automatically wake up when the PLP FIFO is not empty. The PLP FIFO not empty flag may set the run bit 102 in the PSW. If the wake-up bit 90 is set and the MTC Run bit 102 is cleared, the MTC run bit 102 will be set whenever the PLP FIFO empty flag goes inactive (i.e., when it has received one or more parameter list addresses).

The enable bit 96 enables the MTC to participate in arbitration (the selection of which MTC will next execute an instruction). This bit is set and cleared by enable and pause instructions. The enable bit 96 also controls start up. Writing to the first 256 addresses of the PLP FIFO will start an MTC as long as at least one MTC PSW has its enable bit 96 set. Writing to the upper 256 bits requires the enable bit 96 in the appropriate MTC PSW be set in order for it to start up as a result of the write.

The MTC high priority (HP) bit 98 defines the priority of the MTC in MTE arbitration. Eligible MTCs with the HP bit 98 set are selected to run before MTCs whose HP bit 98 is not set.

The waiting for data (WFD) bit 94 is set if the MTC is waiting for data after a READ or cyclic redundancy check instruction is executed. When a READ instruction is initiated, the MTC must wait for the data to arrive. The READ instruction sets the WFD bit 94 and causes the arbiter to select the next MTC to execute an instruction. When the data for an MTC arrives in the read FIFO, the WFD bit 94 is cleared, allowing the MTC to be selected by the arbiter, which only selects MTCs in the Ready state.

An MTC can be in one of 5 states: Executing, Waiting for Data, Ready, Idle, and Inactive. If an MTC is in the Executing, Waiting for Data, or Ready state, the run bit 102 bit is one. If the wake-up bit 90 is set to one and the run bit 102 is zero, the MTC is Idle (however, as explained above, it will become Ready if a wake-up event occurs). If the MTC's run bit 102 is zero and the wake-up bit 90 is also zero, the MTC is Inactive and no task is assigned to it.

As shown in FIG. 4b, control instructions (shown in FIG. 7) consist of a 6-bit op code (in this case, indicating a control instruction), a 7-bit control code identifying the type of operation, and a 7-bit parameter indicating the addresses where the instruction is to be performed. Control instructions do not require an operand.

Referring to FIG. 7, the chart 106 lists MTE control instruction code assignments, including the control field 108 of the instruction, the name 110 of the instruction, the parameter field 112 of the instruction, and the control function 114. The NEXT instruction 116 is of particular interest for purposes of this invention.

An executing MTC relinquishes control of the processor when it executes a READ, HALT, or PAUSE instruction (the HALT and PAUSE instructions are control instructions). READ and PAUSE leave the run and wake-up bits in the PSW unchanged. HALT clears the run bit. READ puts the MTC in the Waiting for Data state. HALT puts the MTC in Idle or Inactive state, depending on whether the wake-up bit is set to one. PAUSE puts the MTC in a Ready state. The arbiter then places the next Ready MTC in an Executing state.

The NEXT instruction loads the current MTC's MX register with an index to the next inactive MTC (if there is one; if there isn't, the Zero flag is set). The current MTC can, using indexed addressing, activate this next inactive MTC by writing to its PSW's run and wake-up bits as well as its program counter, and thus assign it a task.

With reference to FIG. 8, when a NEXT control instruction is executed (block 164), each of the other MTCs is checked to find the next inactive MTC. Initially, a variable "n" is set to zero (block 166) and incremented by one each time an MTC's status is checked (block 168). If no inactive MTC is found after all MTCs have been checked (i.e., n=6) (block 170), a zero flag is set (block 172).

Each MTC is checked to determine whether it is inactive (block 174), i.e., whether either the run or wake-up bits in the MTC's PSW have been set (block 176). If either of the bits are set, the MTC is active (block 180) and another MTC is checked (block 168). However, if neither the run or wake-up bits are set (block 176), the MTC is inactive (block 182). When an inactive MTC is found, the MX register of the executing MTC is set to the inactive MTC (block 184). The run and wake-up bits of the inactive MTC are set and an instruction is written to the program counter in the inactive MTC's PSW (block 186) to activate that MTC (block 188). After an inactive MTC is activated, the search for an inactive MTC is stopped (block 190).

What is claimed is:

1. A semiconductor chip having an index addressing system for determining available memory space, said index addressing system comprising:

a) a plurality of memory transfer controllers, each memory transfer controller having an active and inactive state, each memory transfer controller configured to move a block of data from a source address to a destination address when said memory transfer controller is active, each memory transfer controller associated with a plurality of dual port data memory registers and hardware registers; and b) means for locating an inactive memory transfer controller, thereby finding available memory space associated with said inactive memory transfer controller, said locating performed by an active memory transfer controller.

2. The chip of claim 1 further including means for activating the inactive memory transfer controller, wherein activation includes loading an index register of an active memory transfer controller with an index of the inactive memory transfer controller.

3. The chip of claim 2 wherein means for activating the inactive memory transfer controller further includes writing to the inactive memory transfer controller's hardware registers.

4. A semiconductor chip having a memory transfer engine, said memory transfer engine comprising:

a) a plurality of memory transfer controllers, each memory transfer controller configured to move a block of data from a source address to a destination address, each memory transfer controller having:

i) a plurality of hardware registers, said plurality of hardware registers directly accessible by the associated memory transfer controller, said plurality of hardware registers including:

A) a program counter configured to hold an address of a next instruction to be executed by the memory transfer controller; and B) an index register configured to identify the memory transfer controller that will execute the next instruction;

ii) a plurality of dual port data memory registers, said plurality of dual port data memory registers directly accessible by the associated memory transfer controller;

iii) a plurality of buffers to store data communicated between the semiconductor chip's global bus and the memory transfer controller; and iv) means for activating an inactive memory transfer controller;

b) a hardware processor in electrical communication with the plurality of memory transfer controllers, said processor shared by the plurality of memory transfer controllers in a round robin, time-sliced manner; and c) an arbiter in electrical communication with the plurality of memory transfer controllers, said arbiter configured to select a memory transfer controller to execute an instruction.

5. The memory transfer engine of claim 4 wherein each of the plurality of memory transfer controllers can address the plurality of dual port data memory registers of another memory transfer controller.

6. The memory transfer engine of claim 4 wherein each of the plurality of memory transfer controllers can address the plurality of hardware registers of another memory transfer controller.

7. The memory transfer engine of claim 4 wherein each of the hardware registers and the dual port data memory registers may be accessed by the chip's global bus.

8. The memory transfer engine of claim 4 further including a parameter list pointer buffer in electrical communication with the plurality of memory transfer controllers, said parameter list pointer buffer containing a command for the memory transfer engine, said command written to said parameter list pointer buffer by a processor element in the semiconductor chip.

9. The memory transfer engine of claim 4 further including an instruction memory in electrical communication with the plurality of memory transfer controllers, said instruction memory containing all instructions which may be executed by the plurality of memory transfer controllers.

10. The memory transfer engine of claim 4 further including an instruction register in electrical communication with the plurality of memory transfer controllers, said instruction register containing an instruction to be execute by one of the plurality of memory transfer controllers.

11. The memory transfer engine of claim 4 further including means for finding available memory space by finding an inactive memory transfer controller.

12. The memory transfer engine of claim 4 further including means for activating an inactive memory transfer controller.

13. The memory transfer engine of claim 4 further including a bit block transfer engine configured to perform byte alignment of data transfers.

14. In a semiconductor chip, a method of determining available memory space by determining the availability of the memory's associated memory controller, said method comprising:

a) finding an inactive memory transfer controller;

b) loading an index register of an active memory transfer controller with an index of the inactive memory transfer controller; and c) activating said inactive memory transfer controller, wherein data may be written to memory corresponding to a newly activated memory transfer controller.

15. The method of claim 14 wherein the finding step includes executing an instruction to determine whether there is a memory transfer controller that is inactive.

16. The method of claim 15 wherein the finding step is performed by an active memory transfer controller.

17. The method of claim 14 wherein the activating step includes writing to at least one of the inactive memory transfer controller's hardware registers.

* * * * *